United States Patent
Phillips

(10) Patent No.: US 10,046,428 B2
(45) Date of Patent: Aug. 14, 2018

(54) METHOD AND APPARATUS FOR SECURING A WORKPIECE TO A FIXTURE PLATE USING AN ADJUSTABLE, LOW-PROFILE, LIGHT-DUTY WORKPIECE CLAMP

(71) Applicant: Steven E. Phillips, Boylston, MA (US)

(72) Inventor: Steven E. Phillips, Boylston, MA (US)

(*) Notice: Subject to any disclaimer, the term of this patent is extended or adjusted under 35 U.S.C. 154(b) by 0 days.

(21) Appl. No.: 14/594,283

(22) Filed: Jan. 12, 2015

(65) Prior Publication Data
US 2015/0352675 A1    Dec. 10, 2015

Related U.S. Application Data

(63) Continuation of application No. 13/020,390, filed on Feb. 3, 2011, now Pat. No. 8,931,772.

(60) Provisional application No. 61/337,397, filed on Feb. 3, 2010.

(51) Int. Cl.
*B23Q 3/06* (2006.01)
*B25B 5/06* (2006.01)

(52) U.S. Cl.
CPC ............... *B23Q 3/06* (2013.01); *B25B 5/06* (2013.01); *Y10T 29/49998* (2015.01)

(58) Field of Classification Search
CPC .... B23Q 3/06; B25B 5/06; B25B 5/08; B25B 3/10
See application file for complete search history.

(56) References Cited

U.S. PATENT DOCUMENTS

| | | | |
|---|---|---|---|
| 416,096 A | 11/1889 | Dom | |
| 936,767 A | 10/1909 | Van Eyck | |
| 2,322,707 A | 6/1943 | Wetzler | |
| 2,771,155 A | 11/1956 | Palmore | |
| 2,779,275 A | 1/1957 | Spainhour | |
| 3,140,113 A | 7/1964 | Williams | |
| 3,296,763 A | 1/1967 | Curl | |
| 3,315,637 A | 4/1967 | Taylor | |
| 3,436,072 A * | 4/1969 | Svenson | B25B 5/105 269/94 |
| 3,575,373 A | 4/1971 | Reinhardt et al. | |
| 3,608,886 A * | 9/1971 | Greene | B23Q 3/06 144/307 |
| 3,682,467 A * | 8/1972 | Heinrich | B25B 5/142 269/137 |
| 3,951,395 A | 4/1976 | Hennenfent et al. | |
| 4,069,999 A | 1/1978 | Rew | |
| 4,157,819 A * | 6/1979 | Meyer | B25B 5/08 269/231 |
| 4,196,897 A * | 4/1980 | Gordon | B23Q 3/06 269/157 |
| 4,232,856 A | 11/1980 | Eichfeld et al. | |
| 4,261,558 A | 4/1981 | Carossino | |
| 4,387,610 A * | 6/1983 | Sergeant | B25B 9/02 29/267 |

(Continued)

FOREIGN PATENT DOCUMENTS

WO    WO 2009/147366    12/2009

*Primary Examiner* — Christopher M Koehler
*Assistant Examiner* — Seahee Yoon
(74) *Attorney, Agent, or Firm* — Pandiscio & Pandiscio

(57) ABSTRACT

A workpiece clamp comprising:
a body;
a workpiece-engaging spring edge connected to the body; and
an opening for accepting a screw for securing the body to a fixture plate.

5 Claims, 10 Drawing Sheets

(56) References Cited

U.S. PATENT DOCUMENTS

| | | | |
|---|---|---|---|
| 4,622,822 A | 11/1986 | Beitner | |
| 4,653,953 A | 3/1987 | Anderson et al. | |
| 4,759,488 A | 7/1988 | Robinson et al. | |
| 4,821,393 A * | 4/1989 | Spigarelli | B23Q 3/183 |
| | | | 269/224 |
| 4,915,367 A | 4/1990 | Carossino | |
| 4,928,917 A | 5/1990 | Wolf | |
| 5,026,033 A | 6/1991 | Roxy | |
| 5,305,992 A | 4/1994 | Kish | |
| 5,355,678 A * | 10/1994 | Beitner | B25B 5/06 |
| | | | 269/254 R |
| 5,657,971 A * | 8/1997 | Williams | B23Q 3/002 |
| | | | 269/16 |
| 5,785,307 A * | 7/1998 | Chung | B25B 5/06 |
| | | | 269/254 CS |
| 5,979,110 A | 11/1999 | Tai | |
| 6,394,348 B1 * | 5/2002 | Tratar | G06K 7/015 |
| | | | 235/449 |
| 6,435,496 B1 | 8/2002 | Phillips | |
| 8,931,772 B2 | 1/2015 | Phillips | |
| 8,979,086 B2 | 3/2015 | Phillips | |
| 2006/0090327 A1 | 5/2006 | Garcia | |
| 2010/0064488 A1 * | 3/2010 | Li | H05K 7/1053 |
| | | | 24/532 |
| 2011/0193282 A1 | 8/2011 | Phillips | |
| 2011/0295414 A1 * | 12/2011 | Lambert | H05K 13/021 |
| | | | 700/217 |

* cited by examiner

METHOD AND APPARATUS FOR SECURING A WORKPIECE TO A FIXTURE PLATE USING AN ADJUSTABLE, LOW-PROFILE, LIGHT-DUTY WORKPIECE CLAMP

REFERENCE TO PENDING PRIOR PATENT APPLICATIONS

This patent application is a continuation of pending prior U.S. patent application Ser. No. 13/020,390, filed Feb. 3, 2011 by Steven E. Phillips for METHOD AND APPARATUS FOR SECURING A WORKPIECE TO A FIXTURE PLATE USING AN ADJUSTABLE, LOW-PROFILE, LIGHT-DUTY WORKPIECE CLAMP, which in turn claims benefit of prior U.S. Provisional Patent Application Ser. No. 61/337,397, filed Feb. 3, 2010 by Steven E. Phillips for WORKPIECE CLAMPS.

The above-identified patent applications are hereby incorporated herein by reference.

FIELD OF THE INVENTION

This invention relates to workpiece clamps in general, and more particularly to light-duty workpiece clamps for securing a workpiece to a fixture plate during manufacturing quality inspections and the like.

BACKGROUND OF THE INVENTION

Workpiece clamps are used to secure a workpiece to a fixture plate during machining, measurement, inspection, etc.

One particular type of workpiece clamp is designed to secure a workpiece to a fixture plate during manufacturing quality inspections, i.e., where the workpiece must be held stationary while it is measured and/or otherwise inspected. With this type of workpiece clamp, the clamp must generate sufficient force ("light-duty") to hold a workpiece securely in place on the fixture plate while the workpiece is inspected (e.g., with a coordinate measuring machine, optical comparator, etc.), but the workpiece clamp does not need to generate the high level of force ("heavy-duty") that would be required during a metal stock removal operation (e.g., machining, drilling, etc.). In this respect it will be appreciated that reliably securing the workpiece to the fixture plate during inspection is generally quite important since, if the workpiece moves during inspection, the inspection points will be skewed and the quality of the inspection compromised.

Of course, these light-duty workpiece clamps may also be used for other, non-inspection applications (e.g., light metal manufacturing processes and/or woodworking processes) where only light holding forces are required. By way of example but not limitation, these light-duty workpiece clamps may also be used during laser etching, parts marking, soldering, routing, etc., and/or for applying a light force to a wood part so as to ensure straightness during cutting, etc.

Unfortunately, existing light-duty workpiece clamps are not entirely satisfactory. More particularly, existing light-duty workpiece clamps all tend to suffer from one or more disadvantages, including but not limited to: (i) time-consuming set-up and take-down; (ii) restricted access to the workpiece; (iii) the need to use hand tools to assist in the removal or insertion of a workpiece; (iv) cost; (v) restricted methods of use; (vi) an inability to scale to different sizes; (vii) an inability to be used with standard fixture plates; and/or (viii) a need to manufacture the workpiece clamps out of specific materials.

OBJECTS OF THE INVENTION

Accordingly, a primary object of the present invention is to provide a novel light-duty workpiece clamp which addresses the deficiencies of the prior art.

Another object of the present invention is to provide a novel workpiece clamp with a spring action that allows for the quick and easy replacement of a workpiece to be inspected, thereby speeding up the inspection process.

And another object of the present invention is to provide a low-profile workpiece clamp which provides greater access to the workpiece which is being clamped.

Still another object of the present invention is to provide a novel workpiece clamp with a spring action that eliminates the need for hand tools to assist in the removal or insertion of a workpiece which is to be inspected.

Yet another object of the present invention is to provide a one-piece clamp design with a spring action that is not only relatively simple to use, but also relatively inexpensive to manufacture.

Another object of the present invention is to provide a novel workpiece clamp that can be used on its primary gripping edge and, simultaneously if desired, also on the edges adjacent to, or opposite from, the primary gripping edge, e.g., as a straightedge or a stop to secure a workpiece to a fixture plate. This way, several workpiece clamps can complement each other in custom fixture designs.

And another object of the present invention is to provide a novel workpiece clamp with a geometry that can be scaled to substantially any size, in order to accommodate the specific size and shape of the workpiece which is to be secured.

Still another object of the present invention is to provide a workpiece clamp which can be used with standard fixture plates and/or incorporated into existing fixtures.

Yet another object of the present invention is to provide a workpiece clamp that can be manufactured in plastic, metal and/or any other material that may be appropriate for a given application. In this respect it will be appreciated that plastic is typically a good choice as a non-marring material and, if molded, the parts can be produced inexpensively and in many sizes and colors.

Another object of the present invention is to provide a workpiece clamp assembly comprising a plurality of workpiece clamps that can be used to secure one workpiece to a fixture plate and/or incorporated into a multi-workpiece fixture.

And another object of the present invention is to provide a novel workpiece clamp that can be used with a standard thumbscrew.

Still another object of the present invention is to provide a workpiece clamp which addresses the principles of "Lean manufacturing" by reducing the time it takes for the non-value-added step of workpiece inspection.

SUMMARY OF THE INVENTION

These and other objects of the present invention are addressed by the provision and use of a novel adjustable, low-profile, light-duty workpiece clamp for securing a workpiece to a fixture plate. The novel workpiece clamp generally comprises a workpiece-engaging spring edge, and additional edges which can also be used to engage and secure a workpiece to a fixture plate. The novel workpiece clamp is intended to be secured to the fixture plate by thumbscrews and the like and, to this end, the novel workpiece clamp comprises slots and/or other openings to accept the thumbscrews. The thumbscrews are tightened into the fixture plate, with the heads of the thumbscrews securing the workpiece clamp to the fixture plate.

In one preferred form of the invention, the workpiece-engaging spring edge of the novel workpiece clamp comprises a cantilever spring.

In another preferred form of the invention, the workpiece-engaging spring edge of the novel workpiece clamp comprises a leaf spring.

In another embodiment of the present invention, the workpiece-engaging spring edge of the novel workpiece clamp is made to include and/or accept supplemental structures designed to engage a workpiece, closer to the plane of the fixture plate than the workpiece-engaging spring edge and/or with more force than just the workpiece-engaging spring edge alone and/or with a different profile than just the workpiece-engaging spring edge alone. By way of example but not limitation, the supplemental structure (e.g., a cone, sphere, cylinder, rectangular block, etc.) may be attached to the front gripping edge of the spring in order to concentrate and direct forces onto the workpiece. Such an arrangement could also allow the workpiece to be held at an even lower profile in order to gain more access to the workpiece. It should be appreciated that the supplemental structures may be formed integral with the workpiece-engaging spring edge and/or mountable to the workpiece-engaging spring edge, e.g., at the time of use.

In one preferred form of the present invention, there is provided a workpiece clamp comprising:
a body;
a workpiece-engaging spring edge connected to the body; and
an opening for accepting a screw for securing the body to a fixture plate.

In another preferred form of the present invention, there is provided a method for securing a workpiece to a fixture plate, the method comprising:
providing a workpiece clamp comprising:
a body;
a workpiece-engaging spring edge connected to the body; and
an opening for accepting a screw for securing the body to a fixture plate;
positioning a workpiece on the fixture plate, against an immovable object; and
engaging the workpiece with the workpiece-engaging spring edge of the workpiece clamp so as to secure the workpiece to the fixture plate.

In another preferred form of the present invention, there is provided a system for holding a workpiece in position, the system comprising:
at least one workpiece clamp comprising:
a body; and
a workpiece-engaging spring edge connected to the body; and
a stop for opposing the at least one workpiece clamp;
wherein the workpiece is held between the at least one workpiece clamp and the stop.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIG. 16 is a schematic perspective view showing the workpiece clamp of FIG. 14 securing a workpiece to a fixture plate; and FIG. 17 is a schematic side view showing the workpiece clamp of FIG. 14 securing a workpiece to a fixture plate.

DETAILED DESCRIPTION OF THE PREFERRED EMBODIMENTS

Figure 1:
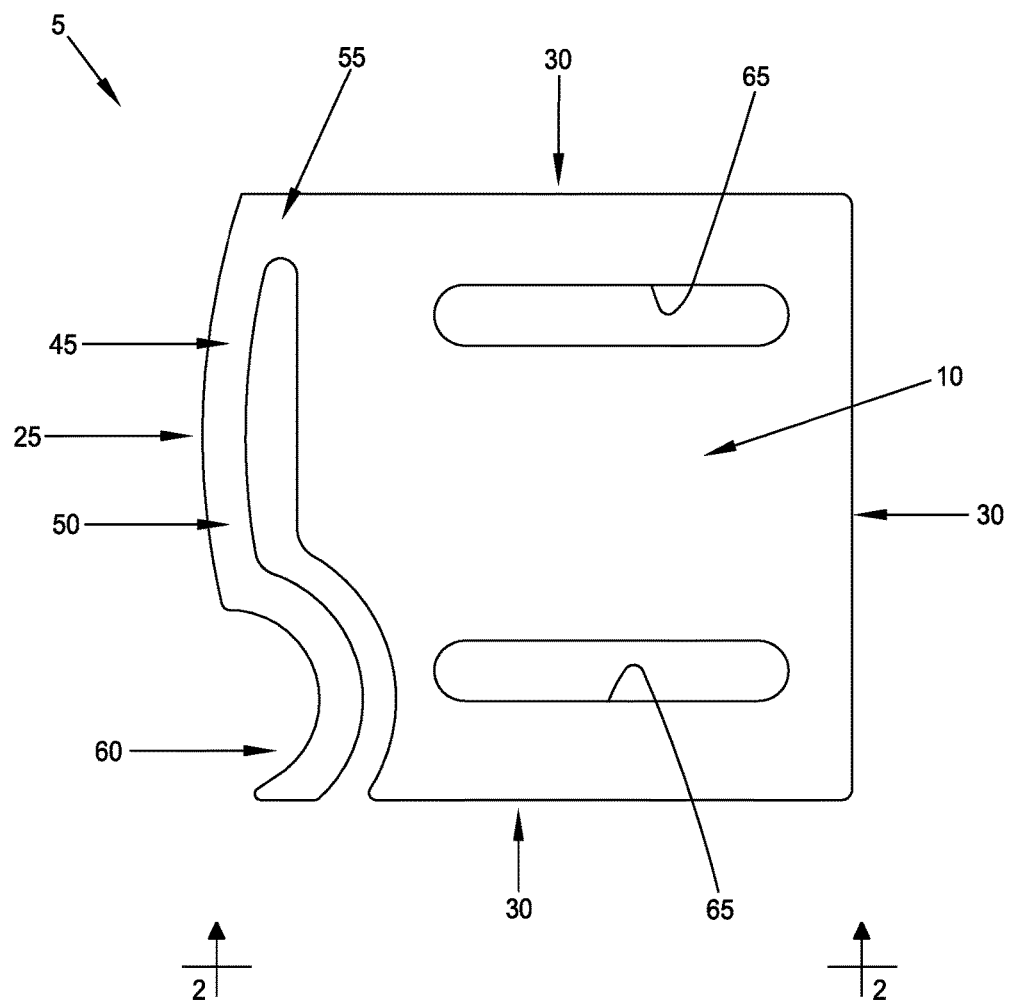
FIG. 1 is a schematic top view showing an adjustable, low-profile, light-duty workpiece clamp formed in accordance with the present invention.
Figure 2:
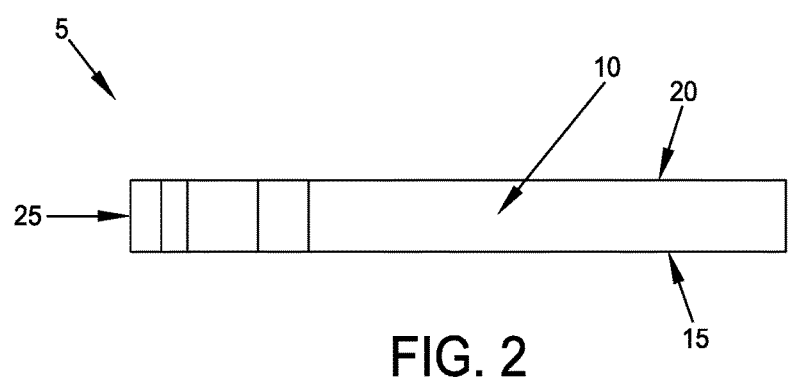
FIG. 2 is a schematic side view of the adjustable, low-profile, light-duty workpiece clamp of FIG. 1.

Looking first at FIGS. 1 and 2, there is shown a novel adjustable, low-profile, light-duty workpiece clamp 5 for securing a workpiece to a fixture plate. Workpiece clamp 5 generally comprises a body 10 having a flat bottom surface 15 and a (preferably) flat top surface 20. Body 10 comprises a workpiece-engaging spring edge 25 and additional edges 30. In this form of the invention, the workpiece-engaging spring edge 25 is carried by a cantilever spring 45. Cantilever spring 45 comprises an arm 50 which is connected to body 10 by a neck 55. Cantilever spring 45 preferably also includes a finger recess 60 near its free end, so that cantilever spring 45 can be manually forced back, towards body 10, against the power of the spring. Body 10 also comprises one or more slots 65 for receiving thumbscrews, such that body 10 can be secured to a fixture plate via the thumbscrews.

Figure 3:
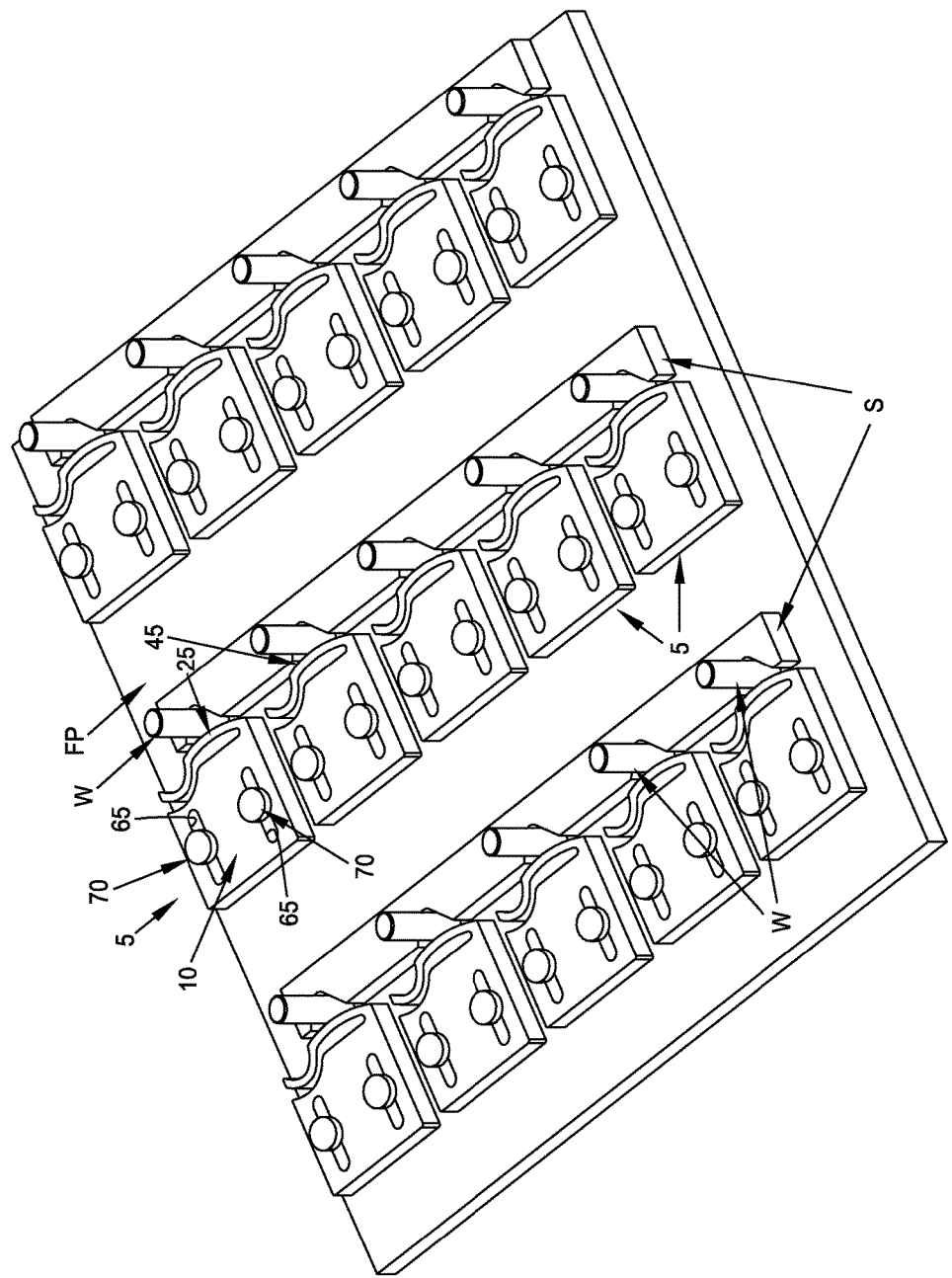
FIG. 3 is a schematic perspective view showing the workpiece clamp of FIG. 1 securing a workpiece to a fixture plate.

Workpiece clamp 5 may be used to secure a workpiece to a fixture plate. By way of example but not limitation, and looking now at FIG. 3, the workpiece W may be placed on the top surface of a fixture plate FP. Fixture plate FP includes a plurality of screw holes SH (not visible in FIG. 3, but visible in others of the figures which will hereinafter also be discussed). Preferably these screw holes SH are formed in the fixture plate FP with a regular pattern, and regular spacing, in order to facilitate utilization of the present invention with substantially any desired set-up configuration. The workpiece W is placed in position against a stop S which is located on the fixture plate FP, and then workpiece clamp 5 is used to clamp workpiece W to stop S, e.g., by using workpiece-engaging spring edge 25 of cantilever spring 45 to press workpiece W against stop S while thumbscrews 70 secure workpiece clamp 5 to fixture plate FP.

In one preferred mode of operation, (i) workpiece W is first placed against stop S; (ii) workpiece clamp 5 is loosely fastened to fixture plate FP with thumbscrews 70 while workpiece-engaging spring edge 25 of cantilever spring 45 is spaced from the workpiece; (iii) workpiece-engaging spring edge 25 of cantilever spring 45 is manually pressed back towards body 10 of the workpiece clamp, e.g., by pressing inwardly on finger recess 60; (iv) workpiece clamp 5 is advanced towards workpiece W and thumbscrews 70 tightened so as to secure the workpiece clamp to fixture plate FP; and (v) the manual pressure being applied to finger recess 60 of cantilever spring 45 is released so that workpiece-engaging spring edge 25 of cantilever spring 45 engages workpiece W and holds it securely against stop S.

Significantly, if it is thereafter desired to inspect another workpiece W, the just-inspected workpiece W is removed from fixture plate FP by simply pressing cantilever spring 45 back towards body 10 (e.g., using finger recess 60), the just-inspected workpiece W is removed from fixture plate FP, a new workpiece W is positioned against stop S, and then the manual pressure being applied to finger recess 60 of cantilever spring 45 is released so that workpiece-engaging spring edge 25 of cantilever spring 45 engages the new workpiece W and holds it securely against stop S.

Figure 4:
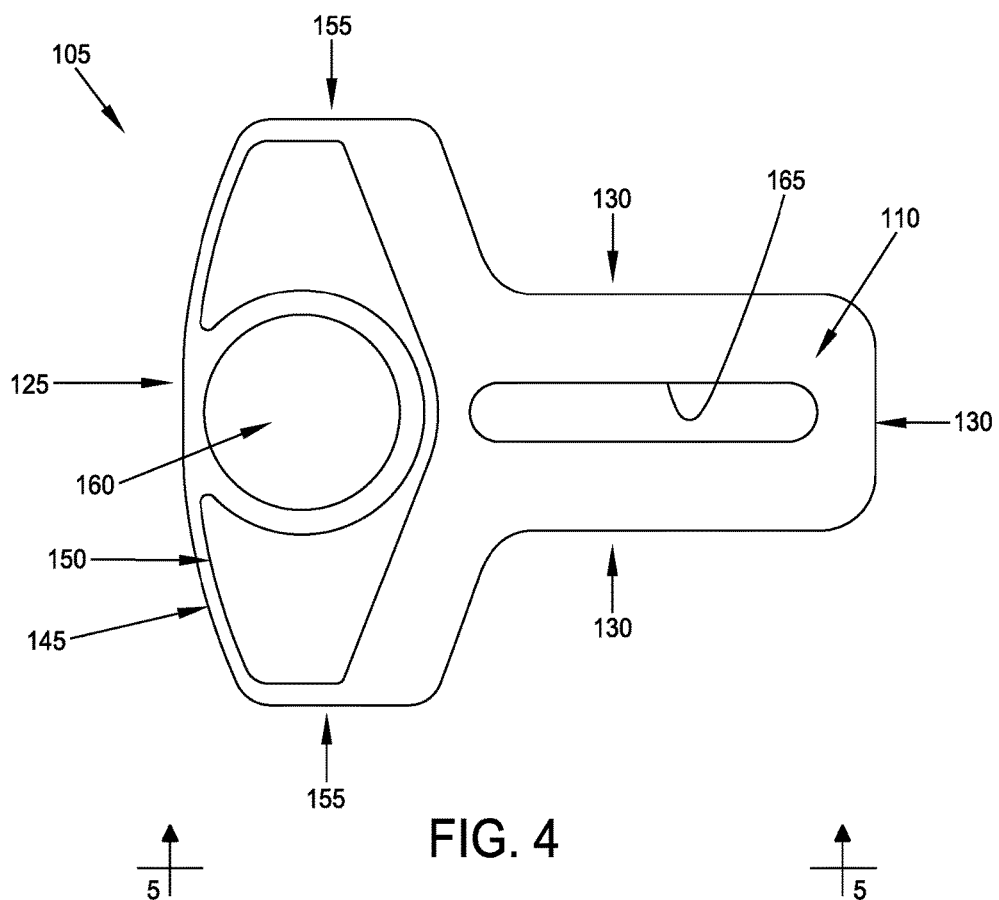
FIG. 4 is a schematic top view showing another adjustable, low-profile, light-duty workpiece clamp formed in accordance with the present invention.
Figure 5:
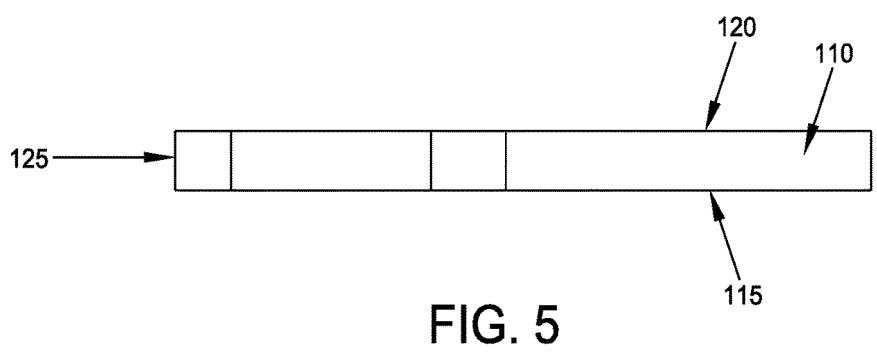
FIG. 5 is a schematic side view of the adjustable, low-profile, light-duty workpiece clamp of FIG. 4.

Looking next at FIGS. 4 and 5, there is shown a novel adjustable, low-profile, light-duty workpiece clamp 105 for securing a workpiece to a fixture plate. Workpiece clamp 105 generally comprises a body 110 having a flat bottom surface 115 and a (preferably) flat top surface 120. Body 110 comprises a workpiece-engaging spring edge 125 and additional edges 130. In this form of the invention, the workpiece-engaging spring edge 125 is carried by a leaf spring 145. Leaf spring 145 comprises an arm 150 which is connected to body 110 by a pair of necks 155. Leaf spring 145 preferably also includes a finger recess 160 intermediate arm 150, so that leaf spring 145 can be manually forced back, towards body 110, against the power of the spring. Body 110 also comprises one or more slots 165 for receiving thumbscrews, such that body 110 can be secured to a fixture plate via the thumbscrews.

Figure 6:
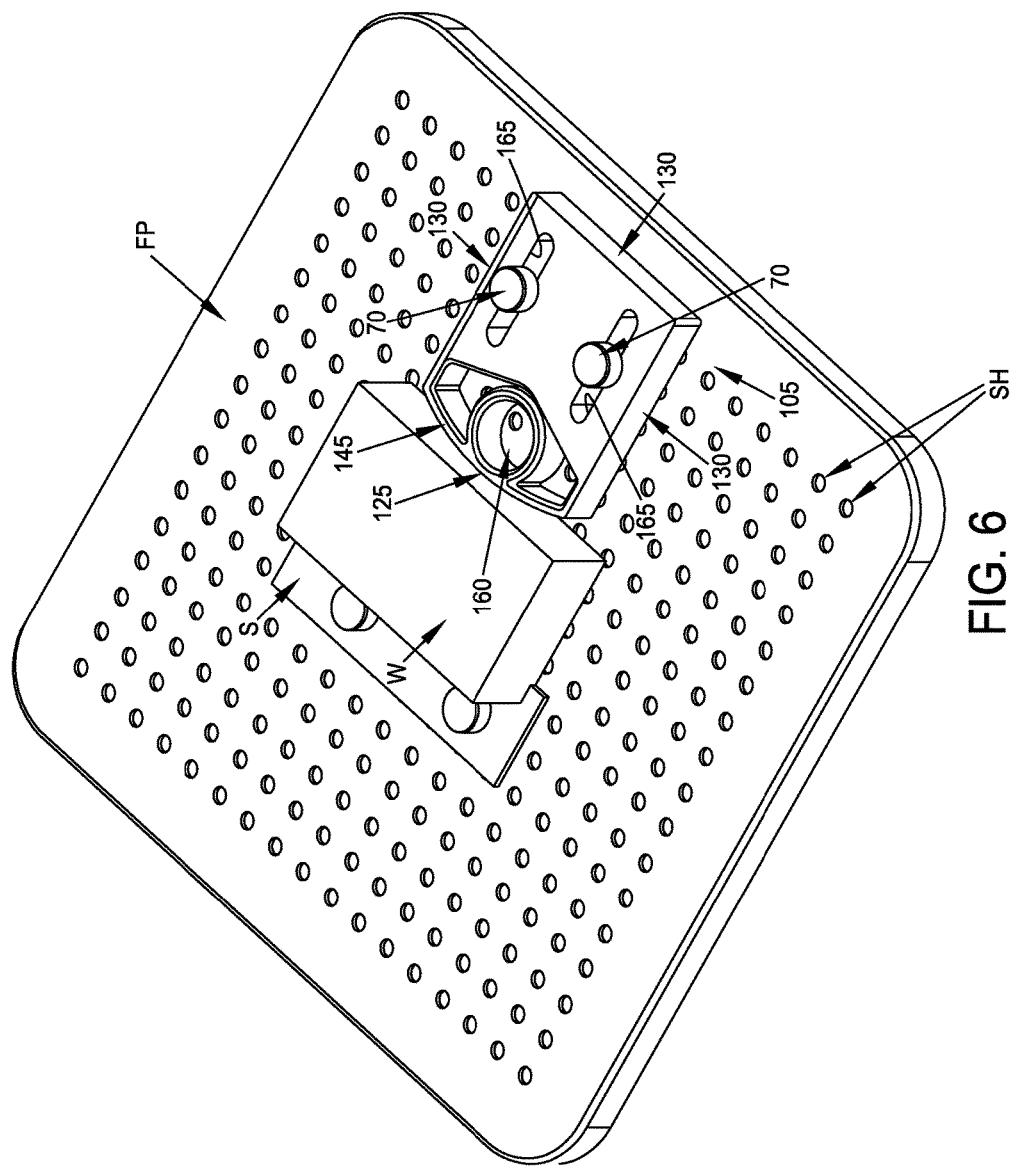
FIG. 6 is a schematic perspective view showing a workpiece clamp similar to that of FIG. 4 (except for having a wider body 10 and being provided with a pair of thumbscrew receiving slots) securing a workpiece to a fixture plate.

Workpiece clamp 105 may be used to secure a workpiece to a fixture plate. By way of example but not limitation, and looking now at FIG. 6, the workpiece W may be placed on the top surface of a fixture plate FP. Fixture plate FP includes a plurality of screw holes SH. Preferably these screw holes SH are formed in the fixture plate FP with a regular pattern, and regular spacing, in order to facilitate utilization of the present invention with substantially any desired set-up configuration. The workpiece W is placed in position against a stop S which is located on the fixture plate FP, and then workpiece clamp 105 is used to clamp workpiece W to stop S, e.g., by using workpiece-engaging spring edge 125 of leaf spring 145 to press workpiece W against stop S while thumbscrews 70 secure workpiece clamp 105 to fixture plate FP.

In one preferred mode of operation, (i) workpiece W is first placed against stop S; (ii) workpiece clamp 105 is loosely fastened to fixture plate FP with thumbscrews 70 while workpiece-engaging spring edge 125 of leaf spring 145 is spaced from the workpiece; (iii) workpiece-engaging spring edge 125 of leaf spring 145 is manually pressed back towards body 110 of the workpiece clamp, e.g., by pressing inwardly on finger recess 160; (iv) workpiece clamp 105 is advanced towards workpiece W and thumbscrews 70 tightened so as to secure the workpiece clamp to fixture plate FP; and (v) the manual pressure being applied to finger recess 160 of leaf spring 145 is released so that workpiece-engaging spring edge 125 of leaf spring 145 engages workpiece W and holds it securely against stop S.

Significantly, if it is thereafter desired to inspect another workpiece W, the just-inspected workpiece W is removed from fixture plate FP by simply pressing leaf spring 145 back towards body 110 (e.g., using finger recess 160), the just-inspected workpiece W is removed from fixture plate FP, a new workpiece W is positioned against stop S, and then the manual pressure being applied to finger recess 160 of leaf spring 45 is released so that workpiece-engaging spring edge 125 of leaf spring 145 engages workpiece W and holds it securely against stop S.

Figure 7:
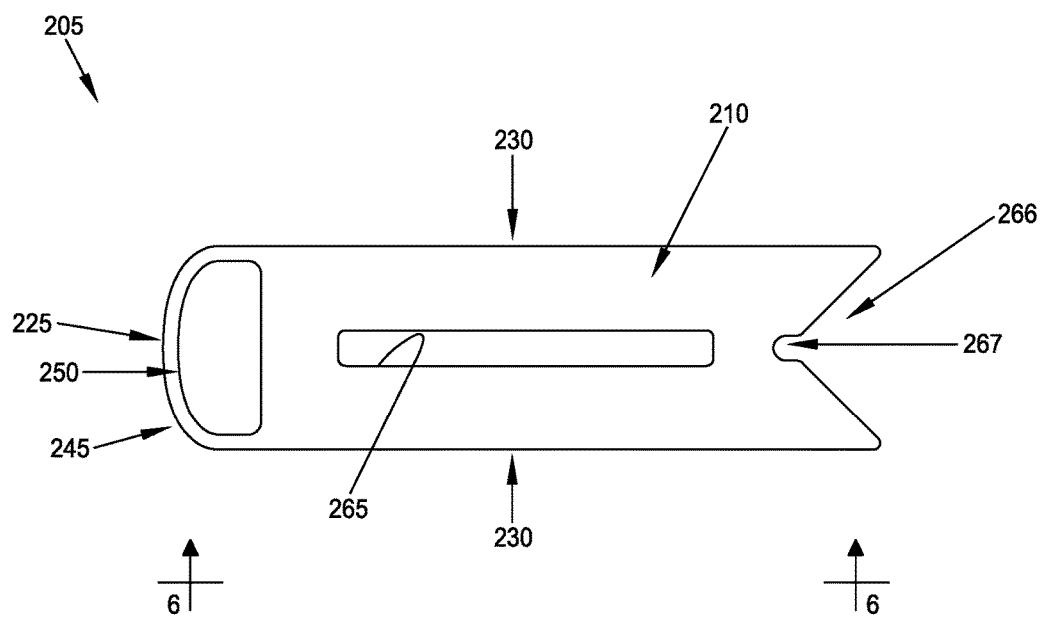
FIG. 7 is a schematic top view showing another adjustable, low-profile, light-duty workpiece clamp formed in accordance with the present invention.
Figure 8:
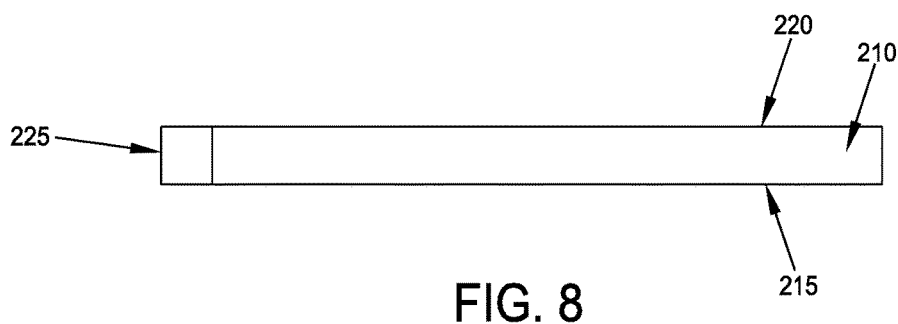
FIG. 8 is a schematic side view of the adjustable, low-profile, light-duty workpiece clamp of FIG. 7.

Looking next at FIGS. 7 and 8, there is shown a novel adjustable, low-profile, light-duty workpiece clamp 205 for securing a workpiece to a fixture plate. Workpiece clamp 205 generally comprises a body 210 having a flat bottom surface 215 and a (preferably) flat top surface 220. Body 210 comprises a workpiece-engaging spring edge 225 and additional edges 230. In this form of the invention, the workpiece-engaging spring edge 225 is carried by a leaf spring 245. Leaf spring 245 comprises a curved arm 250 which is connected to body 210 at each end of the curved arm (see FIG. 7). Body 210 also comprises one or more slots 265 for receiving thumbscrews, such that body 210 can be secured to a fixture plate via the thumbscrews.

Body 210 may also be provided with a "V" notch 266 (e.g., on the edge opposite to workpiece-engaging spring edge 225) which may be used to cradle round parts. An inner undercut 267 may be provided for relief for manufacturing purposes if desired. The "V" notch 266 could be a sharp "V" or a shallow "V", as desired.

Figure 9:
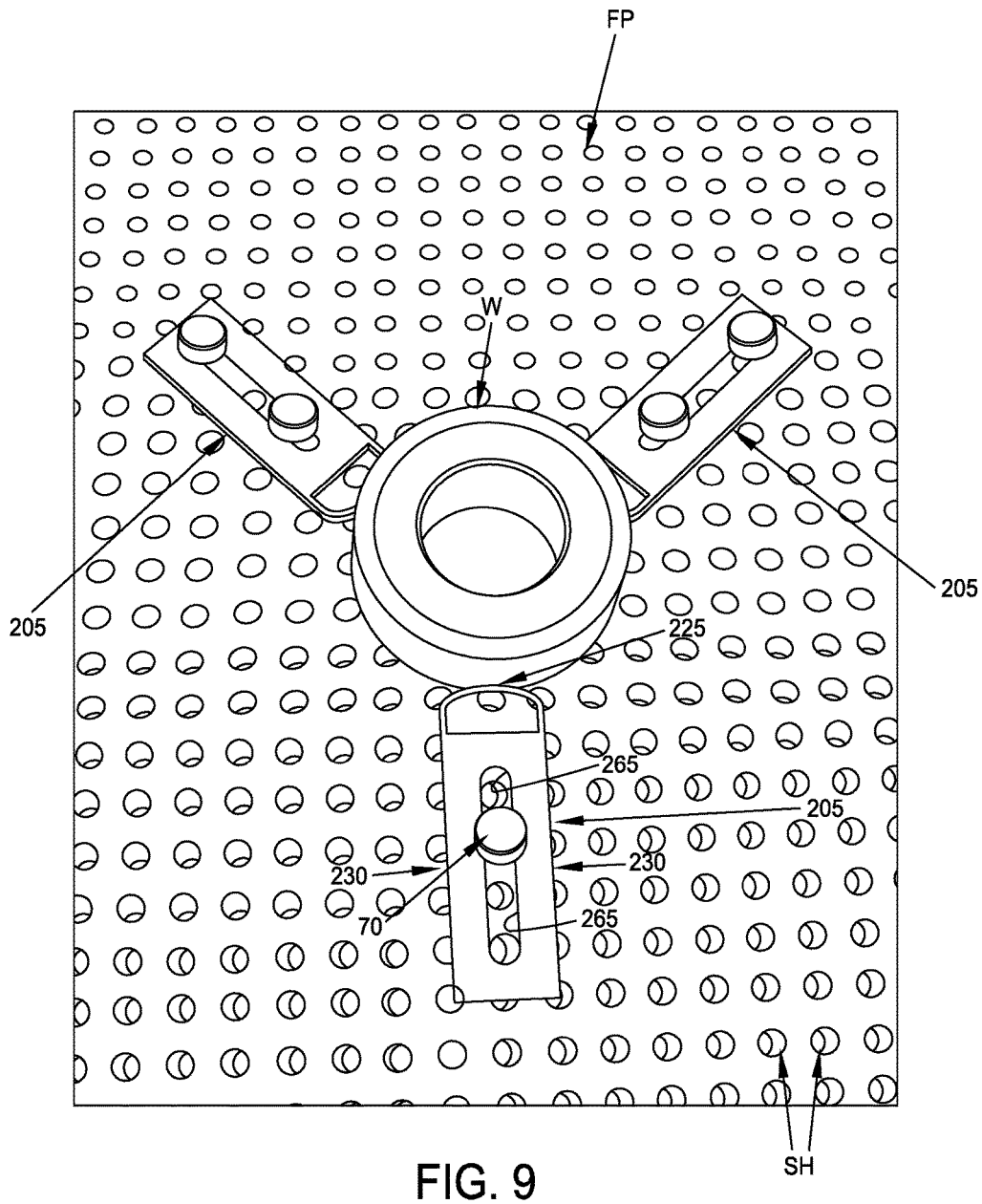
FIG. 9 is a schematic perspective view showing three of the workpiece clamps of FIG. 7 securing a workpiece to a fixture plate.

Workpiece clamp 205 may be used to secure a workpiece to a fixture plate. By way of example but not limitation, and looking now at FIG. 9, the workpiece W may be placed on the top surface of a fixture plate FP. Fixture plate FP includes a plurality of screw holes SH. Preferably these screw holes SH are formed in the fixture plate FP with a regular pattern, and regular spacing, in order to facilitate utilization of the present invention with substantially any desired set-up configuration. Then a plurality of workpiece clamps 205 are used to clamp workpiece W to the fixture plate, i.e., by using the workpiece-engaging spring edge 225 of leaf springs 245 to press workpiece W against the opposing workpiece clamps while thumbscrews 70 secure workpiece clamps 205 to fixture plate FP.

In one preferred mode of operation, (i) workpiece W is first placed on the fixture plate FP; (ii) the workpiece clamps 205 are loosely fastened to fixture plate FP with thumbscrews 70 while workpiece-engaging spring edges 225 of leaf springs 245 are spaced from the workpiece; (iii) workpiece clamps 205 are advanced towards workpiece W and pushed against the workpiece so that leaf springs 245 are deflected towards body 210; and (iv) thumbscrews 70 tightened so as to secure the workpiece clamp to fixture plate FP.

Significantly, if it is thereafter desired to inspect another workpiece W, the just-inspected workpiece W is removed from fixture plate FP by simply pulling the workpiece from the space between the workpiece clamps. A new workpiece W is positioned intermediate the workpiece clamps by pushing a leading section of the workpiece in, at an angle to the plane of fixture plate FP, to the space between the opposing workpiece clamps, and then pushing the workpiece against the pressure of one or more of the curved arms 250 of leaf springs 245 so as to create more space for the workpiece, until the entire workpiece W is located between the opposing workpiece clamps, whereupon pushing pressure on the workpiece is relaxed, leaving the workpiece W secured between the various workpiece clamps.

Figure 10:
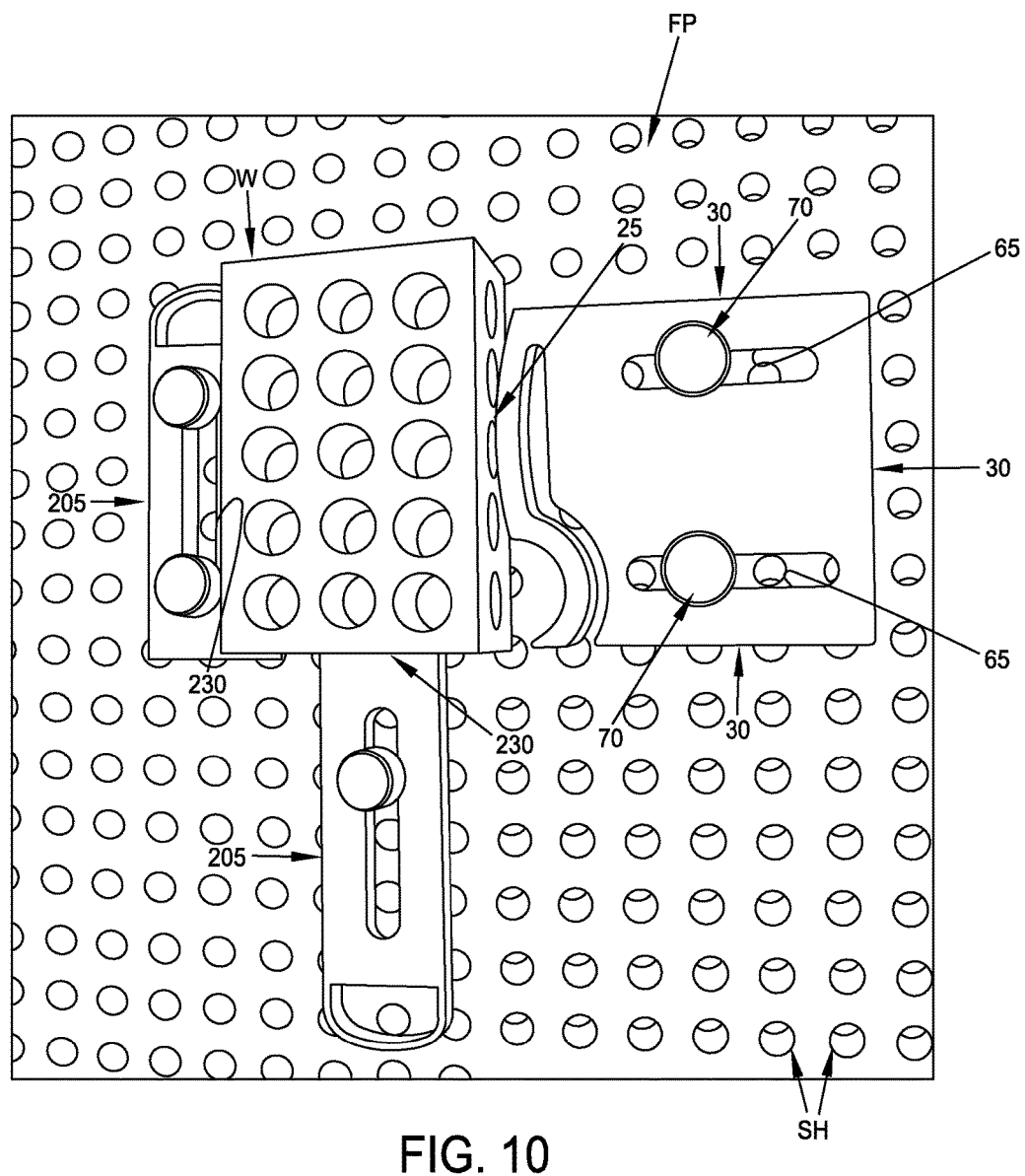
FIG. 10 is a schematic perspective view showing the workpiece clamps of FIGS. 1 and 7 securing a workpiece to a fixture plate, wherein the workpiece clamps of FIG. 7 are shown utilizing their non-spring edges for the workpiece fixation.
Figure 11:
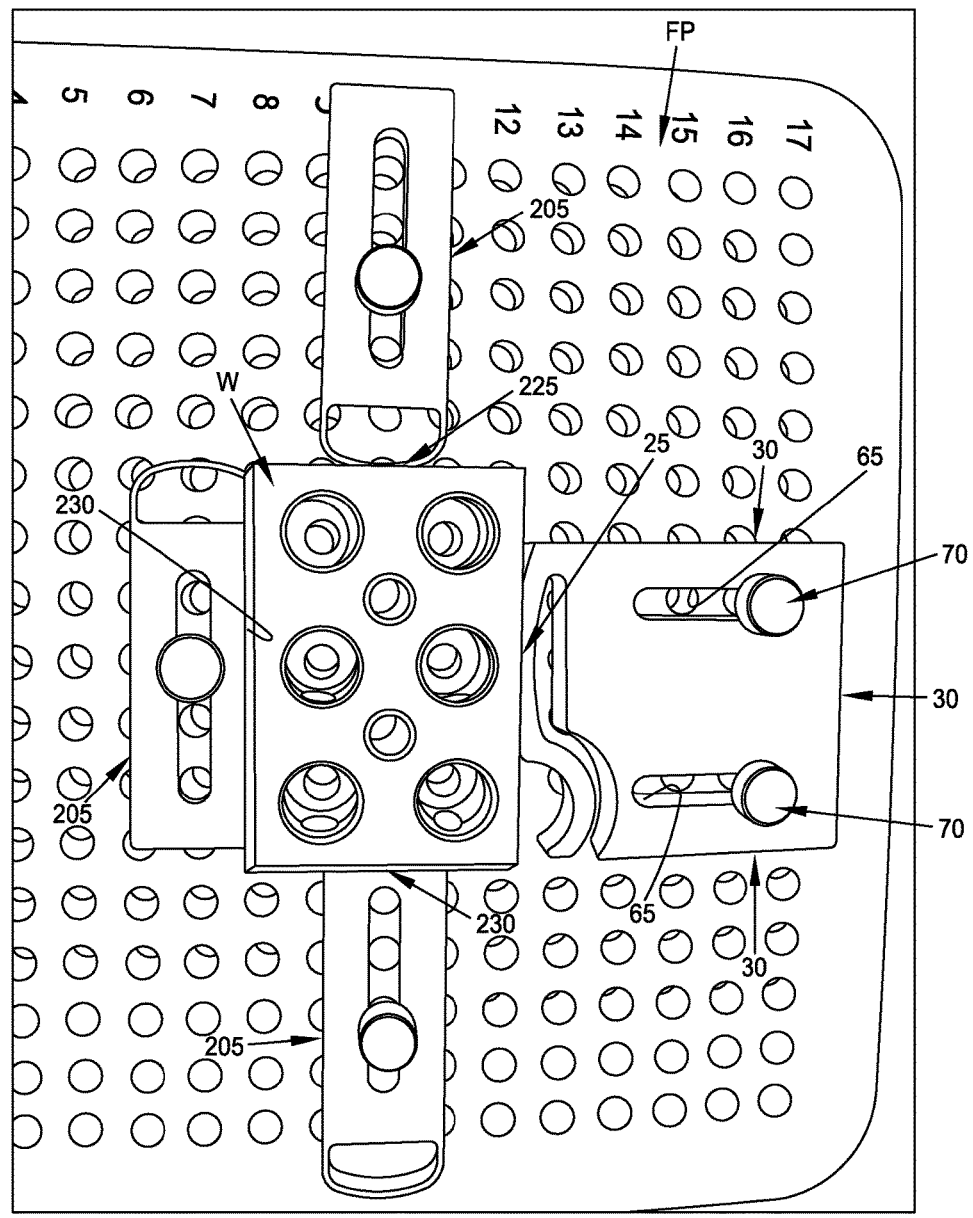
FIG. 11 is another schematic perspective view showing the workpiece clamps of FIGS. 1 and 7 securing a workpiece to a fixture plate.
Figure 12:
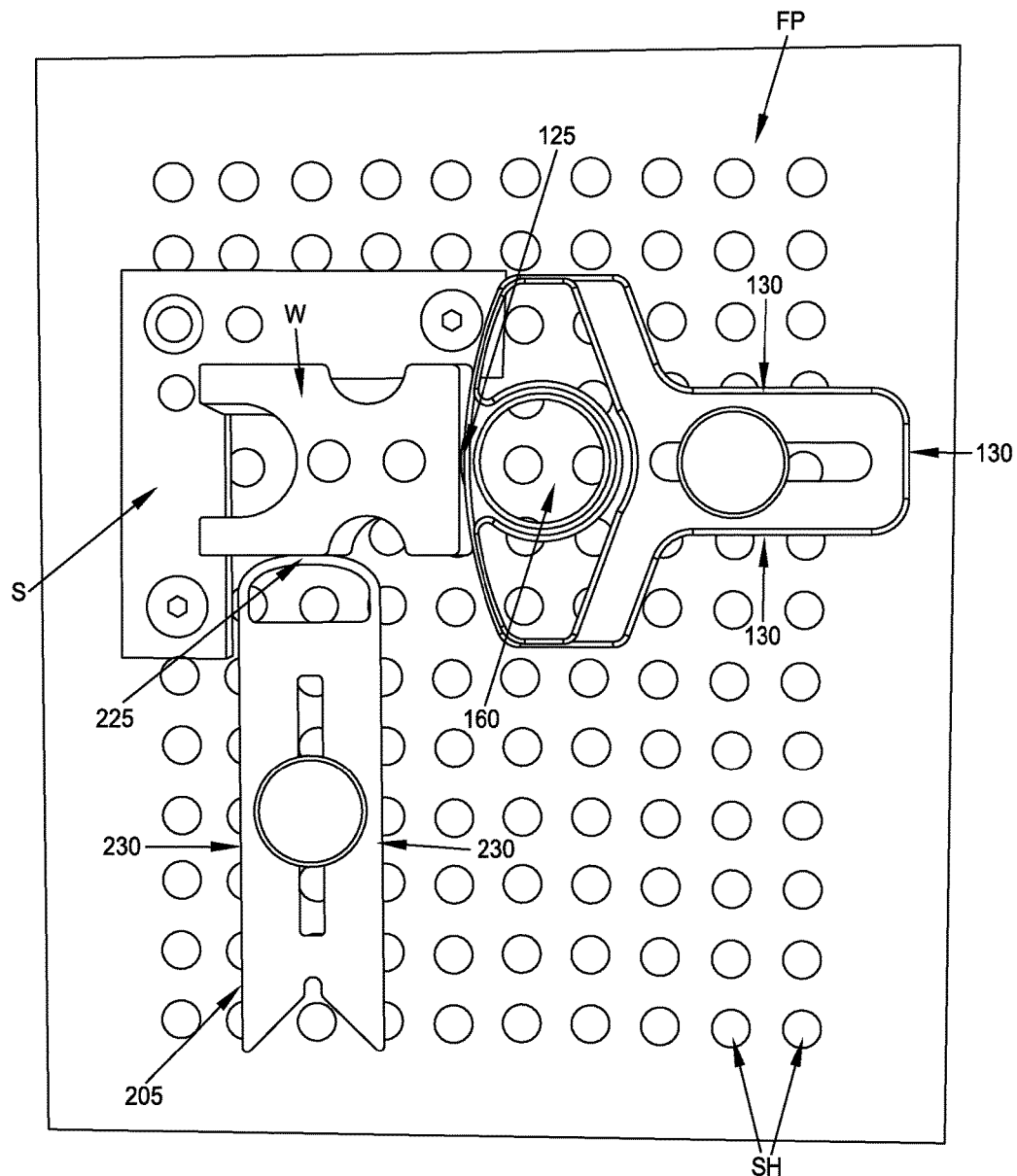
FIG. 12 is a schematic perspective view showing the workpiece clamps of FIGS. 4 and 7 securing a workpiece to a fixture plate.

Significantly, combinations of workpiece clamps 5, workpiece clamps 105 and/or workpiece clamps 205, alone or in combination with other stops S (and/or other workpiece clamps), may be used to secure a workpiece to a fixture plate. See, for example, FIGS. 10-12 which show various exemplary arrangements of workpiece clamps.

And significantly, the additional edges 30 of workpiece clamp 5, the additional edges 130 of workpiece clamp 105 and the additional edges 230 of workpiece clamp 205 can be used as working surfaces to secure a workpiece to a fixture plate. To this end, it is generally preferred that one or more of the edges 30, 130 and/or 230 be formed as substantially straight surfaces, although other forms of surfaces (e.g., concave or convex, such as the "V" notch 266 shown in FIG. 7) are also contemplated.

It should be appreciated that the spring of the novel workpiece clamp may be formed integral with the body, in which case the material used to form the spring and the body is both resilient (in order to provide the spring function) and has substantial firmness (in order to provide the body with the requisite structural integrity).

Alternatively, the spring of the novel workpiece clamp may be formed separate from the body and united during manufacture and/or use. In this situation, the spring and the body can be formed from the same material, or they may be formed from separate materials.

Furthermore, in one preferred form of the present invention, the bottom of the spring is co-planar with the bottom of the body; and/or the top of the spring is co-planar with the top of the body; and/or one or both of the bottom and top of the spring is not co-planar with the bottom and top of the body, respectively.

In another embodiment of the present invention, the workpiece-engaging spring edge of the novel workpiece clamp is made to include and/or accept supplemental structures designed to engage a workpiece, closer to the plane of the fixture plate than the workpiece-engaging spring edge and/or with more force than just the workpiece-engaging spring edge alone and/or with a different profile than just the workpiece-engaging spring edge alone. By way of example but not limitation, the supplemental structure (e.g., a cone, sphere, cylinder, rectangular block, etc.) may be attached to the front gripping edge of the spring in order to concentrate and direct forces onto the workpiece. Such an arrangement could also allow the workpiece to be held at an even lower profile in order to gain more access to the workpiece. It should be appreciated that the supplemental structures may be formed integral with the workpiece-engaging spring edge and/or mountable to the workpiece-engaging spring edge, e.g., at the time of use.

Figure 13:
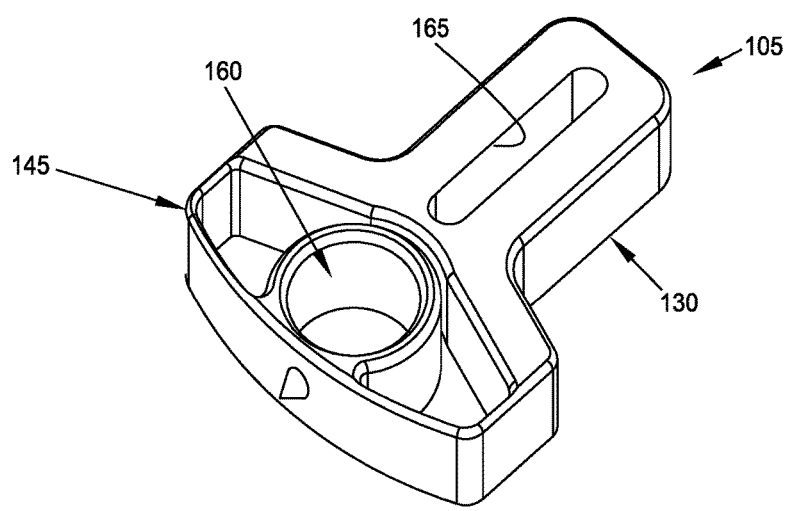
FIG. 13 is a schematic perspective view showing another adjustable, low-profile, light-duty workpiece clamp formed in accordance with the present invention.
Figure 14:
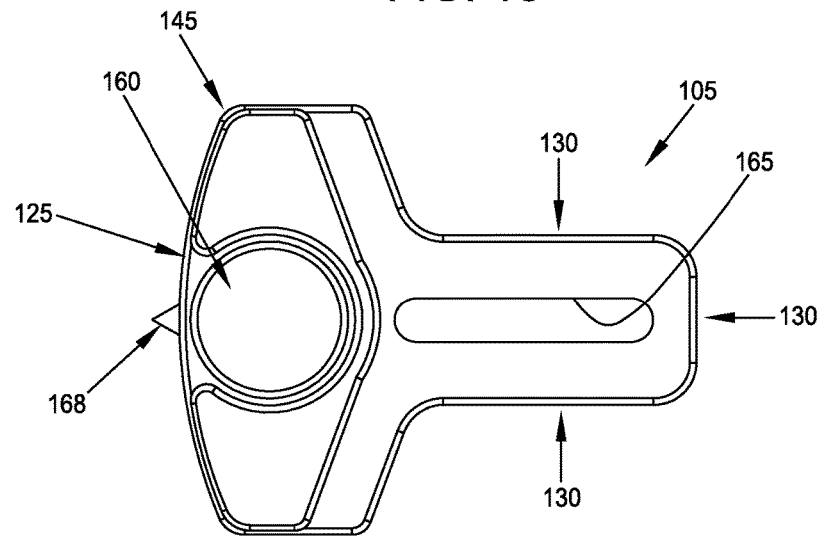
FIG. 14 is a schematic top view of the adjustable, low-profile, light-duty workpiece clamp of FIG. 13.
Figure 15:
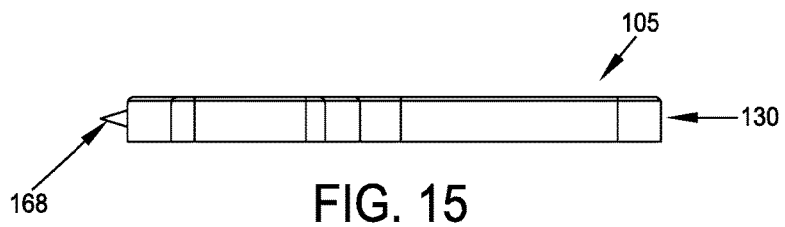
FIG. 15 is a schematic side view of the adjustable, low-profile, light-duty workpiece clamp of FIG. 14.

Thus, for example, and looking now at FIGS. 13-15, there is shown a workpiece clamp 105 having a supplemental structure 168 on workpiece-engaging spring edge 125; and FIGS. 16 and 17 show the workpiece clamp 105 of FIGS. 13-15 securing a workpiece W to a fixture plate FP. Of course, such a supplemental structure (or multiple supplemental structures) may also be provided on the workpiece-engaging spring edges of other workpiece clamps formed in accordance with the present invention, e.g., on the workpiece-engaging spring edge 25 of workpiece clamp 5, workpiece-engaging spring edge 225 of workpiece clamp 205, etc.

Numerous advantages are achieved by the provision and use of the novel light-duty workpiece clamp of the present invention.

For one thing, the present invention provides a novel workpiece clamp with a spring action that allows for quick and easy replacement of a workpiece to be inspected, thereby speeding up the inspection process.

And the present invention provides a low-profile workpiece clamp which provides greater access to the workpiece which is being clamped.

Also, the present invention provides a novel workpiece clamp with a spring action that eliminates the need for hand tools to assist in the removal or insertion of a workpiece which is to be inspected.

The present invention also provides a one-piece clamp design with a spring action that is not only relatively simple to use, but also relatively inexpensive to manufacture.

And the present invention provides a novel workpiece clamp that can be used on its primary gripping edge and, simultaneously if desired, also on the edges adjacent to, or opposite from, the primary gripping edge, e.g., as a straight-edge or a stop to secure a workpiece to a fixture plate. This way, several workpiece clamps can complement each other in custom fixture designs.

Also, the present invention provides a novel workpiece clamp with a geometry that can be scaled to substantially any size, in order to accommodate the specific size and shape of the workpiece which is to be secured.

And the present invention provides a workpiece clamp which can be used with standard fixture plates and/or incorporated into existing fixtures.

Also, the present invention provides a workpiece clamp that can be manufactured in plastic, metal and/or any other material that may be appropriate for a given application. In this respect it will be appreciated that plastic is typically a good choice as a non-marring material and, if molded, the parts can be produced inexpensively and in many sizes and colors.

And the present invention provides a workpiece clamp assembly comprising a plurality of workpiece clamps that can be used to secure one workpiece to a fixture plate and/or incorporated into a multi-workpiece fixture.

The present invention also provides a novel workpiece clamp that can be used with a standard thumb screw.

And the present invention provides a workpiece clamp which addresses the principles of "Lean manufacturing" by reducing the time it takes for the non-value-added step of workpiece inspection.

MODIFICATIONS OF THE PREFERRED EMBODIMENTS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A workpiece clamp comprising:
   a body having a bottom surface and a top surface;
   an arc-shaped workpiece-engaging spring edge having two ends and an apex located centrally therebetween, the workpiece-engaging spring edge being formed integral with the body such that the two ends of the workpiece-engaging spring edge are mounted to opposing sides of the body, and such that the apex of the arc is directed away from the body, the workpiece-engaging spring edge having a bottom surface and a top surface, wherein the bottom surface of the workpiece-engaging spring edge is co-planar with the bottom surface of the body and the top surface of the workpiece-engaging spring edge is co-planar with the top surface of the body;
   a finger recess mounted to the workpiece-engaging spring edge, the finger recess being located at the apex of the workpiece-engaging spring edge and disposed between the workpiece-engaging spring edge and the body; and
   a slot in the body for accepting a screw for securing the body to a fixture plate, the slot being aligned with the finger recess and the apex of the workpiece-engaging spring edge;
   wherein the workpiece-engaging spring edge is resiliently biased away from the body so as to provide a clamping force for clamping a workpiece, and further wherein the direction of the clamping force is oriented perpendicular to a longitudinal axis of a screw disposed in the slot in the body.

2. The workpiece clamp according to claim 1 wherein the workpiece-engaging spring edge comprises at least one supplemental structure for engaging the workpiece, wherein the at least one supplemental structure projects outwardly from a surface of the workpiece-engaging spring edge.

3. The workpiece clamp according to claim 1 further comprising another edge attached to the body, wherein the other edge has a configuration selected from the group consisting of straight, concave and convex.

4. A system for holding a workpiece in position, the system comprising:
   at least one workpiece clamp comprising:
      a body having a bottom surface and a top surface;
      an arc-shaped workpiece-engaging spring edge having two ends and an apex located centrally therebetween, the workpiece-engaging spring edge being formed integral with the body such that the two ends of the workpiece-engaging spring edge are mounted to opposing sides of the body, and such that the apex of the arc is directed away from the body, the workpiece-engaging spring edge having a bottom surface and a top surface, wherein the bottom surface of the workpiece-engaging spring edge is co-planar with the bottom surface of the body and the top surface of the workpiece-engaging spring edge is co-planar with the top surface of the body;
      a finger recess mounted to the workpiece-engaging spring edge, the finger recess being located at the apex of the workpiece-engaging spring edge and disposed between the workpiece-engaging spring edge and the body; and
      a slot in the body for accepting a screw for securing the body to a fixture plate, the slot being aligned with the finger recess and the apex of the workpiece-engaging spring edge;
      wherein the workpiece-engaging spring edge is resiliently biased away from the body so as to provide a clamping force for clamping a workpiece, and further wherein the direction of the clamping force is oriented perpendicular to the longitudinal axis of the screw disposed in the slot in the body; and
   a stop for opposing the at least one workpiece clamp;
   wherein the workpiece is held between the at least one workpiece clamp and the stop.

5. The system according to claim 4 wherein the stop comprises another workpiece clamp.

* * * * *